United States Patent

Cheng

[11] Patent Number: 5,564,671
[45] Date of Patent: Oct. 15, 1996

[54] CUSHION ASSEMBLY FOR A BICYCLE SEAT

[75] Inventor: Tien-Chu Cheng, Taichung Hsien, Taiwan

[73] Assignee: Kalloy Industrial Co., Ltd., Taichung Hsien, Taiwan

[21] Appl. No.: 576,969

[22] Filed: Dec. 26, 1995

[51] Int. Cl.$^6$ .................................................. B62J 1/06
[52] U.S. Cl. ..................... 248/601; 297/209; 297/463.1; 248/622
[58] Field of Search .............................. 297/209, 463.1; 248/600, 601, 618, 622, 218.4; 267/291, 249; 280/283, 275

[56] References Cited

U.S. PATENT DOCUMENTS

| 642,606 | 2/1900 | Haider | 248/601 |
|---|---|---|---|
| 4,182,508 | 1/1980 | Kallai et al. | 297/209 |
| 5,094,424 | 3/1992 | Hartway | 248/600 |
| 5,370,351 | 12/1994 | Chen | 248/600 |
| 5,387,025 | 2/1995 | Denisar | 297/209 |

*Primary Examiner*—Milton Nelson, Jr.
*Assistant Examiner*—Anthony D. Barfield
*Attorney, Agent, or Firm*—Morton J. Rosenberg; David I. Klein

[57] ABSTRACT

A cushion assembly for a bicycle seat includes a tubular member securely mounted to a bicycle seat tube, a seat post partially received in the tubular member and having an upper end to which a bicycle seat is attached, a spring received in the tubular member and having an upper end on which the seat post rests and a lower end abutting against a bottom of the tubular member, a bolt extending from an outside of the bottom of the tubular member through the receptacle to engage with the seat post to move therewith, thereby allowing vertical movements of the seat post in the tubular member. First and second clamp plates are mounted between the tubular member and the seat post and each have a contour complimentary to that of an outer periphery of the seat post, thereby preventing relative rotational movements between the seat post and the tubular member. The tubular member has a plurality of holes defined in a periphery thereof, providing an access to the second clamp plate. A second bolt is adjustably mounted to each of the holes to adjust a position of the second clamp to bear against the seat post. A gap between the tubular member and the seat post, which may be enlarged due to abrasion after a term of use, is reduced to an acceptable manner by turning the second bolts to urge the second clamp plate to bear against the seat post.

3 Claims, 5 Drawing Sheets

CUSHION ASSEMBLY FOR A BICYCLE SEAT

BACKGROUND OF THE INVENTION

1. Field of the Invention

The present invention relates to a cushion assembly for a bicycle seat to improve its stability.

2. Description of Related Art

A typical conventional cushion assembly for a bicycle seat is shown in FIG. 6 of the drawings and generally includes a substantially tubular member 40 having a receptacle 41 defined therein and a peripheral hole 401 defined in an upper end of a periphery thereof, a coil spring 43 mounted in the receptacle 41 of the tubular member 40 with a lower end thereof resting on a bottom surface of the tubular member 40, a seat post 42 telescopically received in the receptacle 41 of the tubular member 40 and bearing against an upper end of the coil spring 43, and a threaded bolt 44 extending upwardly from the bottom of the tubular member 40 to engage with the seat post 42 at an upper end thereof. A seat (not shown) of a bicycle is securely mounted to the seat post 42.

The seat post 42 includes a vertical slit 420 defined in an upper end thereof such that a pin 421 is extended through the peripheral hole 401 in the tubular member 40 and the vertical slit 420 in the seat post 42 to prevent relative rotational movements between the seat post 42 and the tubular member 40. The seat post 42 further includes a transverse hole 422 defined in the upper end thereof and an end cap 45 having a second peripheral hole 47 therein is securely mounted to the upper end of the seat post 42 by inserting a pin 46 through the holes 47 and 422.

After assembly, a lower end of the seat post 42 defines a distance from the bottom surface of the tubular member 40. When the seat is loaded (e.g., a cyclist sits on the seat and cycles on a road), the seat post 42 is moved downwardly and thus compresses the spring 43, thereby providing a cushioning effect. However, such a cushion assembly still has several disadvantages. First, the hole 401 and the slit 420, provided to prevent relative rotational movements between the tubular member 40 and the seat post 42, are relatively small and thus require difficult alignment therebetween during assembly, thereby causing inconvenience in assembly, wasting labor, and increasing cost. In addition, provision of the slit 420 reduces a strength of the seat post 42 which may break when the bicycle seat is loaded with a relatively large weight. Second, a gap between the tubular member 40 and the seat post 42 is enlarged due to abrasion therebetween after a term of use, resulting in unstable engagement relationship between the tubular member 40 and the seat post 42. Third, relative rotational and shaking movements between the tubular member 40 and the seat post 42 (in other words, the bicycle seat) may result due to the enlargement of the gap.

Therefore, there has been a long and unfulfilled need for an improved cushion assembly for a bicycle seat post to mitigate and/or obviate the above problems.

SUMMARY OF THE INVENTION

A cushion assembly for a bicycle seat in accordance with the present invention generally comprises a tubular member adapted to be securely mounted to a seat tube of a bicycle and including a receptacle therein and a bottom, a seat post partially received in the receptacle of the tubular member and having an upper end adapted to be attached to a bicycle seat, a spring received in the receptacle and having an upper end on which the seat post rests and a lower end abutting against the bottom of the tubular member, a bolt extending from an outside of the bottom of the tubular member through the receptacle to engage with the seat post to move therewith, thereby allowing vertical movements of the seat post in the tubular member.

The present invention features that first and second clamp plates are mounted between the tubular member and the seat post and each have a contour complimentary to that of an outer periphery of the seat post, thereby preventing relative rotational movements between the seat post and the tubular member. The tubular member has a plurality of holes defined in a periphery thereof, providing an access to the second clamp plate. A second bolt is adjustably extended into each of the holes to adjust a position of the second clamp. By such an arrangement, a gap between the tubular member and the seat post, which may be enlarged due to abrasion after a term of use, is reduced to an acceptable manner by turning the second bolts to urge the second clamp plate to bear against the seat post.

In accordance with one aspect of the present invention, the first clamp plate includes at least one groove defined in an outer periphery thereof and the tubular member includes a corresponding number of protrusions formed on an inner periphery thereof for fittingly engaging with the associated groove.

In accordance with a further aspect of the present invention, a rigid plate is provided between the second clamp plate and the tubular member to prevent damage to the second clamp plate.

Other objects, advantages, and novel features of the invention will become more apparent from the following detailed description when taken in conjunction with the accompanying drawings.

DESCRIPTION OF THE PREFERRED EMBODIMENT

Figure 1:
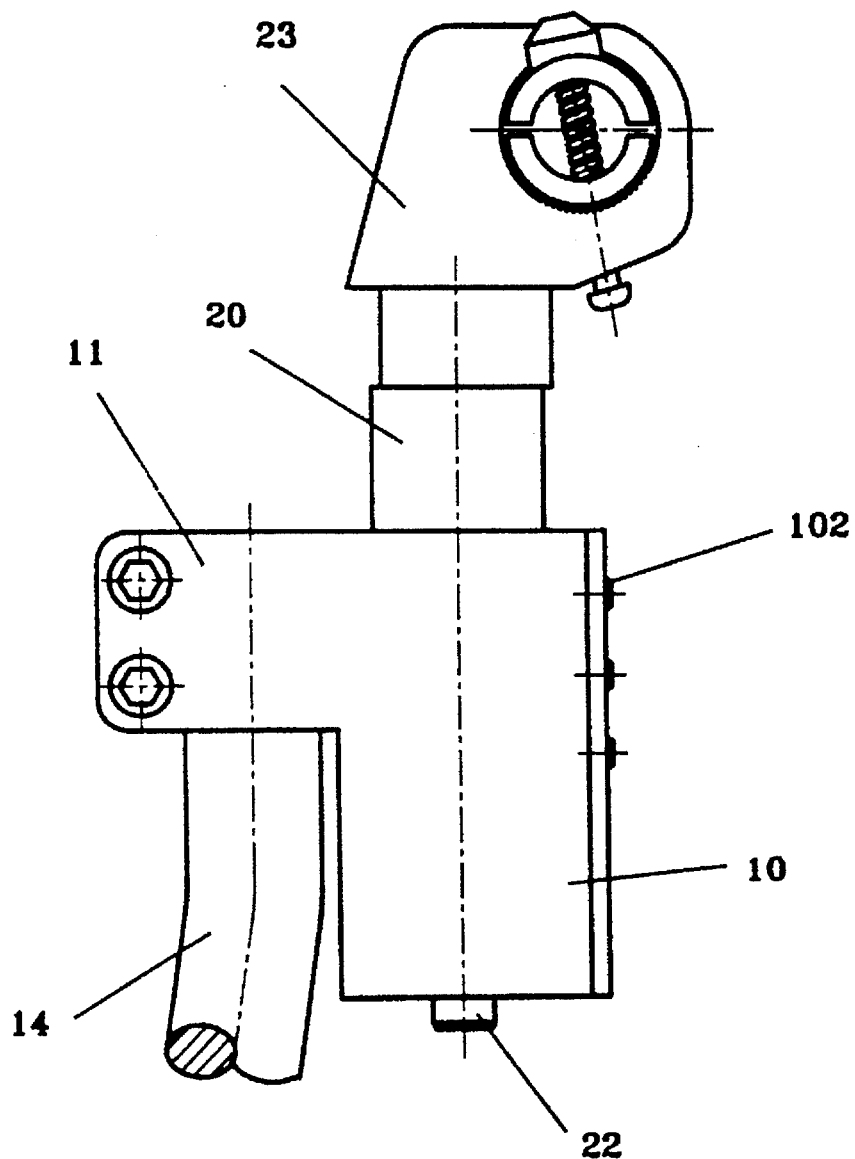
FIG. 1 is a side elevational view of a cushion assembly for a bicycle seat in accordance with the present invention.

Referring now to FIGS. 1 to 4, a cushion assembly for a bicycle seat in accordance with the present invention includes a tubular member 10 having a receptacle 12 defined therein, a seat post 20 partially received in the receptacle 12 of the tubular member 10, a bolt 22 extending through the tubular member 10 for engaging with a hole 200 defined in the seat post 20 to move therewith, and a spring 21 received in the receptacle 12 of the tubular member 10 and having an upper end on which the seat post 20 rests. A first clamp means 23 is securely mounted to an upper end of the seat post 20 for mounting a bicycle seat (not shown) thereon. A second clamp means 11 is mounted to an outer periphery of the tubular member 10 for securely mounting the cushion assembly to a bicycle seat tube 14.

A first clamp plate 30 and a second clamp plate 31 are mounted around the seat post 20 and have contours complimentary to that of the outer periphery of the seat post 20, thereby preventing relative rotational movements between the seat post 20 and the tubular member 10. The tubular member 10 includes a plurality of threaded holes 101 each of which allows a bolt 102 to extend therethrough to push the second clamp plates 31 to move inwardly so as to bear against the seat post 20. Preferably, the first clamp plate 30 includes at least one groove 300 defined in an outer periphery thereof, while the tubular member 10 includes a corresponding number of protrusions 120 extending outwardly from an inner periphery thereof for fittingly engaging with the associated grooves 300. Furthermore, a rigid plate 32 may be provided between the second clamp plate 31 and the inner periphery of the tubular member 10, thereby preventing damage to the second clamp plate 31 by the bolts 102.

Figure 3:
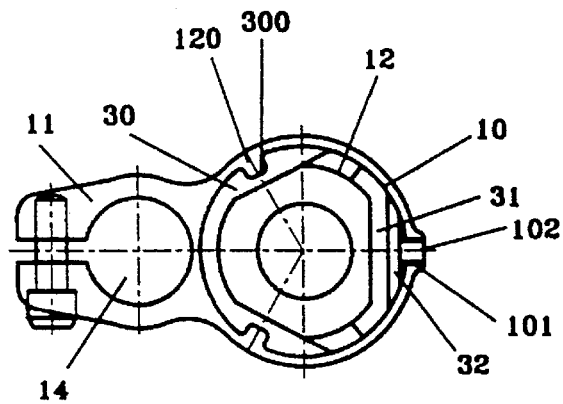
FIG. 3 is a top plan view of the cushion assembly in accordance with the present invention.
Figure 2:
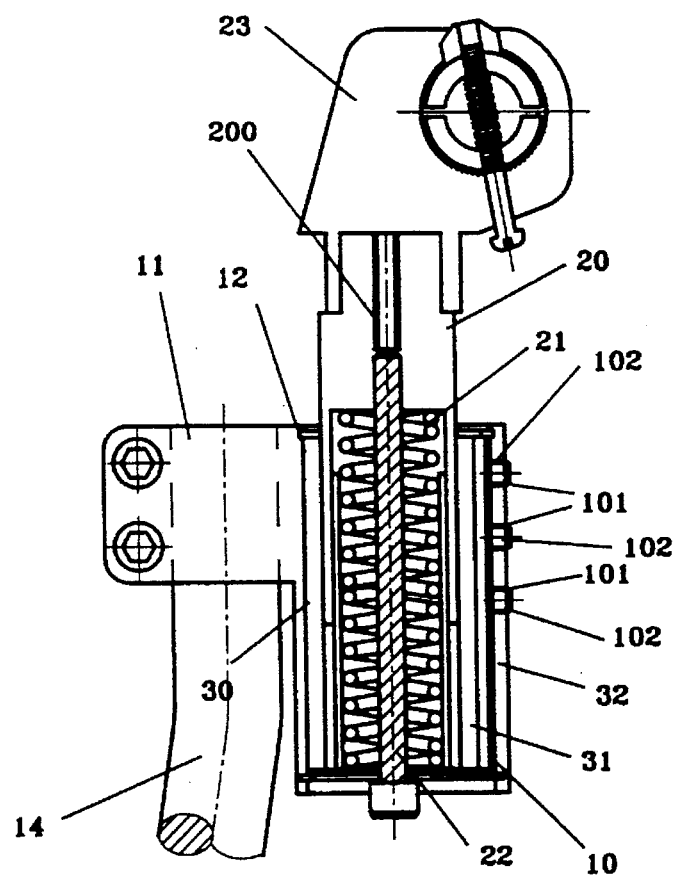
FIG. 2 is a partially sectioned side elevational view of the cushion assembly in accordance with the present invention.
Figure 4:
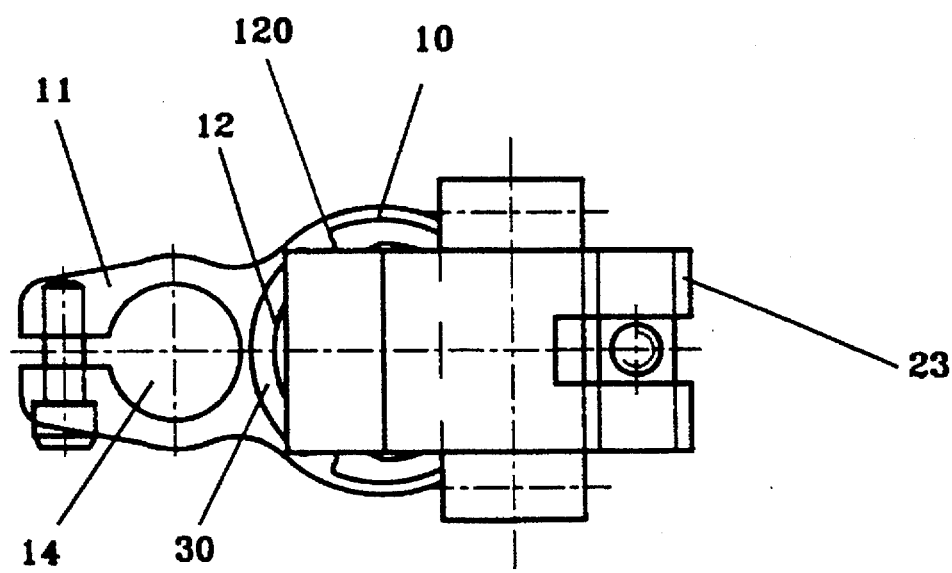
FIG. 4 is a bottom plan view of the cushion assembly in accordance with the present invention.

In assembly, the spring 21 is firstly mounted in the seat post 20 with a lower end thereof extending beyond the seat post 20. Then, the seat post 20 is mounted in the tubular member 10, and the bolt 22 is inserted from an outside of the bottom of the tubular member 10 and extends upwardly to engage with the seat post 20 to move vertically therewith, thereby allowing vertical movements of the seat post 20 in the tubular member 10. As shown in FIG. 2, the seat post 20 is spaced from the bottom of the tubular member 10. Thereafter, first and second clamp plates 30 and 31 are inserted between the inner periphery of the tubular member 10 and the outer periphery of the seat post 20 in which the grooves 300 of the first clamp 30 fittingly engage with the protrusions 120 of the tubular member 10. The rigid plate 32 is optionally inserted between the second clamp plate 31 and the inner periphery of the tubular member 10, as shown in FIG. 3. The first clamp means 23 is mounted to the upper end of the seat post 20 for mounting a bicycle seat thereon, which is conventional and therefore is not further described.

In normal operation, the seat post 20 moves up and down in the tubular member 10 to provide a cushioning effect under cooperation of the spring 21, which is also conventional such that detailed description is not required.

After a term of use, a gap may be generated between the first and second clamp plates 30 and 31 and the seat post 20. Nevertheless, the user may simply rotate the bolts 102 by a tool to urge the second plate 31 (and the rigid plate 32, if used) to move inwardly, thereby reducing the gap, which, in conventional design, the whole tubular member 10 must be replaced should the gap increase to an unacceptable extent. Furthermore, adjustment can be easily and manually achieved without the aid of a technician. Moreover, the provision of the grooves 300 and the protrusions 120 assures a clamping accuracy of the first clamp plate 30 when the second clamp plate 31 is urged to bear against the seat post 20.

According to the above description, it is appreciated that the present invention includes several advantages. First, no troublesome alignment by workers is required as the hole 401 and the slit 420 in the prior art structure are omitted, thereby providing convenience in assembly, saving unnecessary labor and lowering the cost. In addition, the seat post 20 is integral (no slit is defined), providing a stronger structure. Furthermore, the first and second clamp plates 30 and 31 provided between the tubular member 10 and the seat post 20 allow reduction of the gap which may be enlarged due to abrasion after a term of use, thereby improving the stability and preventing loosening and shaking of the seat post 20. In addition, the adjustment of the second clamp plate 31 is simple and saves unnecessary replacement of the tubular member 10.

Figure 5:
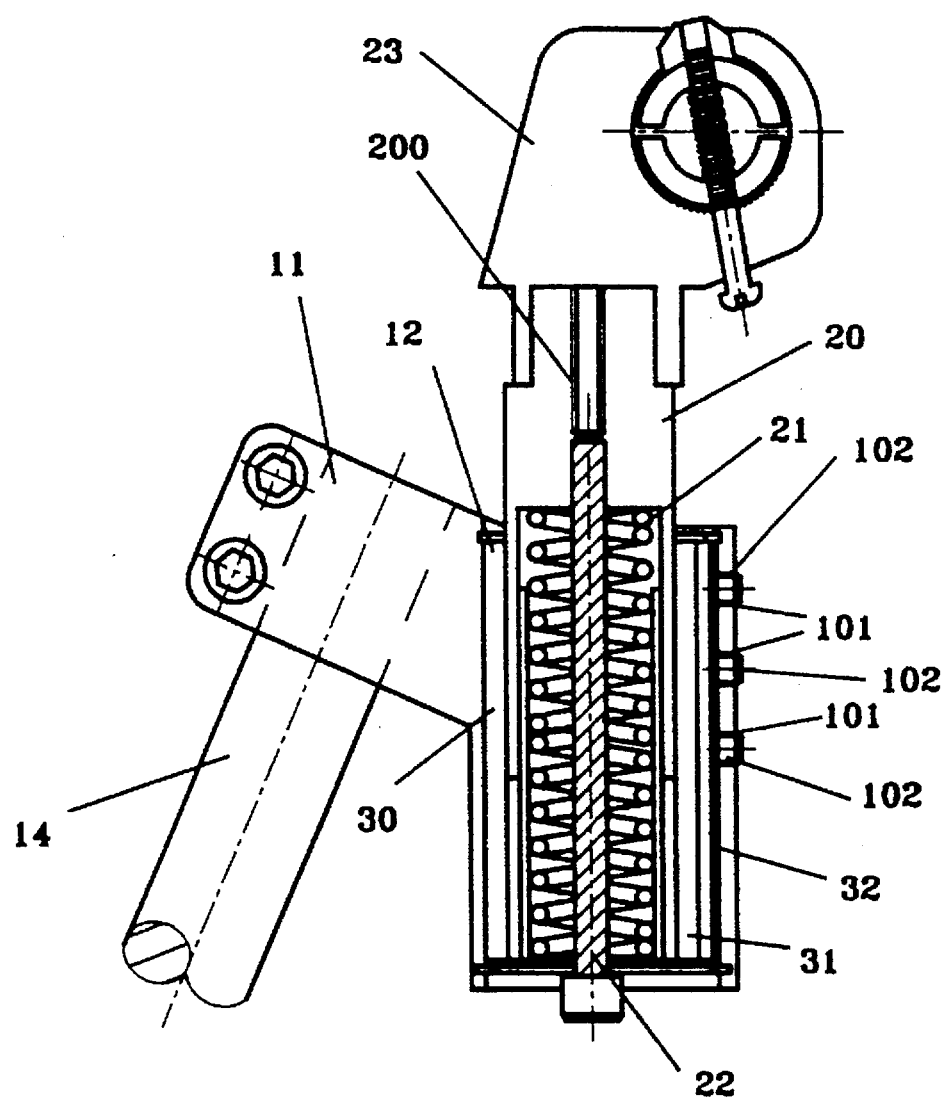
FIG. 5 is a partially-sectioned side elevational view of a second embodiment of a cushion assembly for a bicycle seat in accordance with the present invention.
Figure 6:
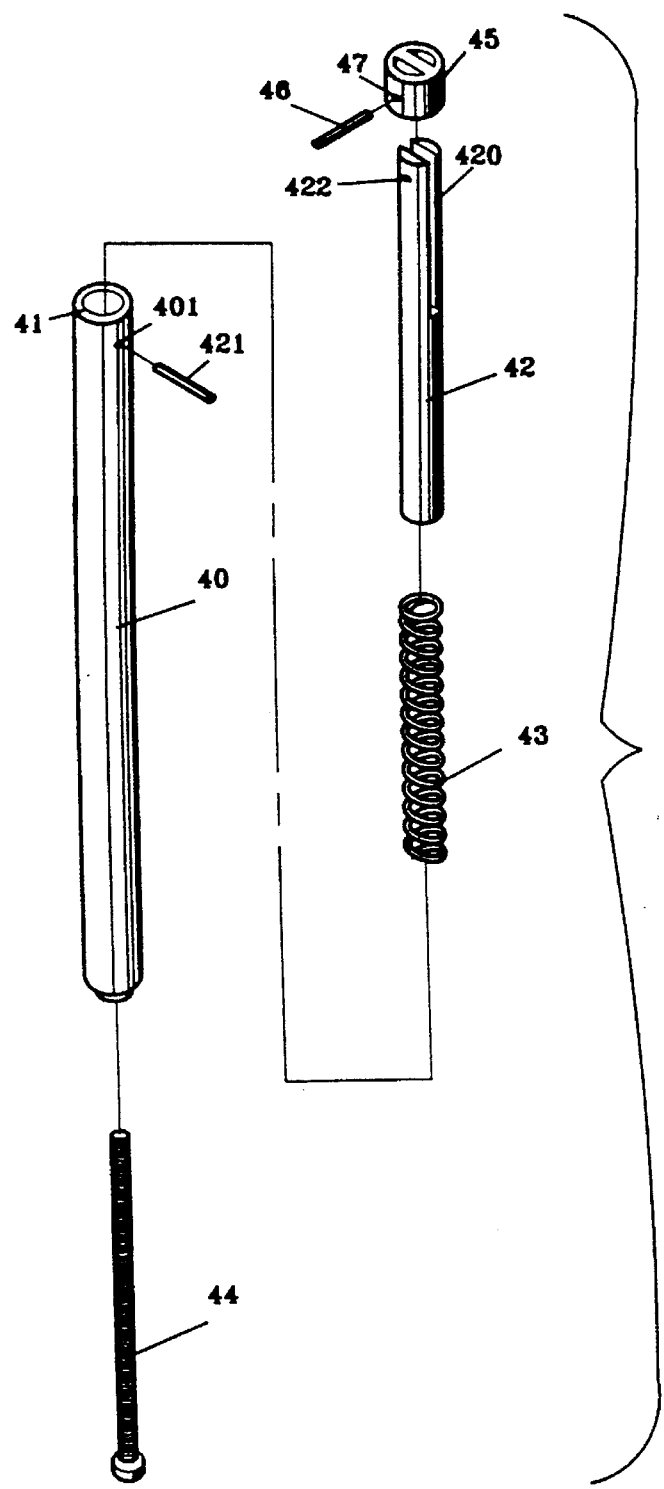
FIG. 6 is an exploded view of a conventional cushion assembly for a bicycle seat according to prior art.

Referring to FIG. 5, preferably, the second clamp means 11 may be at an angle with the tubular member 10 of about 18° to rectify an inclination angle of the bicycle seat which is also about 18°. This may guide the up-and-down movements of the seat post 20 to be in a vertical direction, thereby avoiding breakage and abrasion between the seat post 20 and the tubular member 10 and increasing the cushioning effect.

Although the invention has been explained in relation to its preferred embodiment, it is to be understood that many other possible modifications and variations can be made without departing from the spirit and scope of the invention as hereinafter claimed.

What is claimed is:

1. A cushion assembly for a bicycle seat, comprising:

a tubular member adapted to be securely mounted to a seat tube of a bicycle and including a receptacle therein and a bottom;

a seat post partially received in the receptacle of the tubular member and having an upper end adapted to be attached to a bicycle seat;

a spring received in the receptacle and having an upper end on which the seat post rests and a lower end abutting against the bottom of the tubular member;

a bolt extending from an outside of the bottom of the tubular member through the receptacle to engage with the seat post to move therewith, thereby allowing vertical movements of the seat post in the tubular member;

first and second clamp plates mounted between the tubular member and the seat post and each having a contour complimentary to that of an outer periphery of the seat post, thereby preventing relative rotational movements between the seat post and the tubular member;

the tubular member having a plurality of holes defined in a periphery thereof, providing an access to the second clamp plate; and a second bolt adjustably extended into each of the holes to adjust a position of the second clamp to bear against the seat post.

2. The cushion assembly as claimed in claim 1, wherein the first clamp plate includes at least one groove defined in an outer periphery thereof and the tubular member includes a corresponding number of protrusions formed on an inner periphery thereof for fittingly engaging with the associated groove.

3. The cushion assembly as claimed in claim 1, further comprising a rigid plate provided between the second clamp plate and the tubular member.

* * * * *